(12) United States Patent
Tian et al.

(10) Patent No.: US 12,123,291 B1
(45) Date of Patent: Oct. 22, 2024

(54) METHOD AND SYSTEM FOR UPDATING THREE-DIMENSIONAL LITHOLOGY MODEL FOR PRECISION NAVIGATION OF DEEP OIL AND GAS IN REAL TIME

(71) Applicant: Institute of Geology and Geophysics, Chinese Academy of Sciences, Beijing (CN)

(72) Inventors: Fei Tian, Beijing (CN); Qingyun Di, Beijing (CN); Wenhao Zheng, Beijing (CN); Yongyou Yang, Beijing (CN); Wenjing Cao, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/408,274

(22) Filed: Jan. 9, 2024

(30) Foreign Application Priority Data

Oct. 19, 2023 (CN) .......................... 202311353147.4

(51) Int. Cl.
*G06T 17/05* (2011.01)
*E21B 43/16* (2006.01)

(52) U.S. Cl.
CPC .............. *E21B 43/16* (2013.01); *G06T 17/05* (2013.01); *E21B 2200/20* (2020.05)

(58) Field of Classification Search
None
See application file for complete search history.

(56) References Cited

U.S. PATENT DOCUMENTS

2018/0067219 A1* 3/2018 Xu .......................... G01V 1/303
2021/0255349 A1* 8/2021 Zhou ..................... G01V 1/282

FOREIGN PATENT DOCUMENTS

| CN | 103235339 A | 8/2013 |
| CN | 111913218 A | 11/2020 |
| CN | 112711070 A | 4/2021 |

* cited by examiner

*Primary Examiner* — Kyle Zhai
(74) *Attorney, Agent, or Firm* — Nitin Kaushik (57) ABSTRACT

The present disclosure relates to a method and a system for updating a three-dimensional lithology model for precision navigation of deep oil and gas in real time, aiming to solve the problem that an existing while drilling model is difficult to adapt to a real-time update of the model in a strong heterogeneous reservoir, which leads to a decrease in accuracy of an established prediction model and a lack of a drilling ratio. The present disclosure includes: dividing pre-processed seismic data into three pieces of single-frequency seismic waveform data by a wavelet frequency division method; selecting an optimal single-frequency combination according to a correlation coefficient between gamma ray prediction curves and measured curves at different depths; and computing a single-frequency gamma ray prediction model while drilling, updated with drilling, and a full-band gamma ray distribution model while drilling, updated with drilling, by means of the optimal single-frequency combination.

8 Claims, 3 Drawing Sheets

METHOD AND SYSTEM FOR UPDATING THREE-DIMENSIONAL LITHOLOGY MODEL FOR PRECISION NAVIGATION OF DEEP OIL AND GAS IN REAL TIME

CROSS-REFERENCE TO RELATED APPLICATIONS

The application claims priority to Chinese patent application No. 202311353147.4, filed on Oct. 19, 2023, the entire contents of which are incorporated herein by reference.

TECHNICAL FIELD

The present disclosure belongs to the field of geologic analysis, and particularly relates to a method and a system for updating a three-dimensional lithology model for precision navigation of deep oil and gas in real time.

BACKGROUND

A geosteering system can help drilling personnel to optimize a well trajectory to a designated position of an oil and gas reservoir, so as to obtain a maximum oil drainage area and a best recovery rate, which has become a cutting-edge technology of improving an oil and gas output of a single well and a benefit of oilfield development. The geosteering system has a core content of establishing a dynamically adjusted prediction model while drilling based on real-time uploaded geophysical data, so as to adapt to a higher reservoir drilling ratio in a strongly heterogeneous reservoir.

During model updating, real-time adjustment on structural models for a formation interface, a fracture, etc. has made a great progress. At present, there is still a large development space for updating of prediction models while drilling that indicate the lithology, the physical properties and the oil-gas possibility of the reservoir.

SUMMARY

In order to solve the above problems in the prior art that an existing while drilling model is difficult to adapt to a real-time update of the model in a strong heterogeneous reservoir, which leads to a decrease in accuracy of an established prediction model and a low reservoir drilling ratio. The present disclosure provides a method for updating a three-dimensional lithology model for precision navigation of deep oil and gas in real time, including:

step S100, collecting original seismic data and original logging data, and pre-processing the original seismic data to obtain pre-processed seismic data, the original logging data comprising multi-well gamma ray logging data.

step S200, performing, based on the original logging data, outlier processing by means of an isolated forest algorithm to obtain logging data with outliers deleted, the logging data with the outliers deleted comprising gamma ray parameters with outliers deleted; and standardizing the logging data with the outliers deleted to obtain standardized logging data, the standardized logging data comprising standardized gamma ray parameters;

step S300, performing, based on the pre-processed seismic data, frequency division processing by means of a processed wavelet basis function to obtain frequency-divided seismic data, the frequency-divided seismic data including three types of single-frequency seismic waveform data, i.e. low-frequency seismic data, intermediate-frequency seismic data, and high-frequency seismic data;

step S400, determining a time window top three-dimensional curved surface and a time window bottom three-dimensional surface of a stratum according to a three-dimensional surface of a target horizon and seismic data;

step S500, obtaining a clustering result of single-frequency seismic waveform data in a time window of the stratum by means of a clustering algorithm according to the frequency-divided seismic data and the time window top three-dimensional curved surface and the time window bottom three-dimensional surface of the stratum;

step S600, obtaining frequency-divided inversion data bodies of the gamma ray parameters by performing a waveform indication inversion algorithm on the clustering result of the single-frequency seismic waveform data in the time window of the stratum, the standardized gamma ray parameters and clustering results of a corresponding well depth, well location information and single-frequency seismic waveform data in the time window of the stratum of the standardized gamma ray parameters;

step S700, using the frequency-divided inversion data bodies of the gamma ray parameters as pre-drilling prediction frequency division gamma ray distribution models;

step S800, obtaining a pre-drilling prediction full-band gamma ray distribution model by superimposing the pre-drilling prediction frequency division gamma ray distribution models, determining a threshold value of the pre-drilling prediction full-band gamma ray distribution model according to a logging lithology interpretation, discriminating lithology, and establishing a current pre-drilling lithology prediction model;

step S900, planning a current well trajectory based on the pre-drilling lithology prediction model;

step S1000, extracting a three-dimensional coordinate of the current well trajectory and a borehole-side pre-drilling full-band gamma ray prediction curve or a frequency division gamma ray prediction curve while drilling from the pre-drilling full-band gamma ray distribution model, computing a correlation coefficient between the borehole-side pre-drilling full-band gamma ray prediction curve and a gamma ray curve measured by a real drilling instrument, or a correlation coefficient between the frequency division gamma ray prediction curve while drilling and the gamma ray curve measured by the real drilling instrument, and selecting a combination of single-frequency seismic waveform data with the highest correlation coefficient as a currently selected single-frequency combination;

step S1100, computing a frequency division gamma ray distribution model while drilling, updated by drilling and a full-band gamma ray distribution model updated by drilling according to the frequency-divided inversion data bodies of the gamma ray parameters corresponding to the currently selected single-frequency combination and the gamma ray curve measured by the real drilling instrument; and step S1200, replacing the pre-drilling prediction frequency division gamma ray distribution model with the frequency division gamma ray distribution model while drilling, updated by drilling, and repeating the methods in steps S800-S1100 until a drilling task is completed.

In some preferred implementations, the pre-processing specifically includes:

step A100, expressing a seismic record convolution model of the original seismic data in a frequency domain as:

$$s(\omega)=\sigma(\omega)\varepsilon(\omega),$$

wherein $s(\omega)$ represents a seismic record spectrum after Fourier transform, $\sigma(\omega)$ represents a seismic subwave spectrum after Fourier transform. $\varepsilon(\omega)$ represents a reflection coefficient spectrum after Fourier transform, and $\omega$ represents an angle frequency;

step A200, transforming a representation of the seismic record convolution model in the frequency domain into a representation of a frequency domain of a seismic record linear system:

$$lns(\omega)=ln\sigma(\omega)+ln\varepsilon(\omega),$$

wherein $lns(\omega)$ is the representation of the frequency domain of the seismic record linear system, $ln\sigma(\omega)$ is a representation of a frequency domain of a seismic subwave linear system, and $ln\varepsilon(\omega)$ is a representation of a frequency domain of a reflection coefficient linear system;

step A300, obtaining, by performing inverse Fourier transform on the representation of the frequency domain of the seismic record linear system, a cepstrum sequence of the seismic record spectrum:

$$\tilde{s}(t)=\tilde{\sigma}(t)+\tilde{\varepsilon}(t),$$

wherein $\tilde{s}(t)$ represents the cepstrum sequence of the seismic record spectrum, $\tilde{\sigma}(t)$ represents a cepstrum sequence of the seismic subwave spectrum, $\tilde{\varepsilon}(t)$ represents a cepstrum sequence of the reflection coefficient spectrum, and t represents a seismic arrival-time;

step A400, separating a subwave cepstrum sequence and a reflection coefficient cepstrum sequence in a cepstrum by means of a low-pass filter, and extracting a subwave amplitude;

step A500, simulating a seismic subwave amplitude by means of a least square method based on the subwave amplitude:

$$\sigma(f)=A(f)f^\alpha e^{H(f)},$$

wherein $\alpha$ represents a constant larger than or equal to 0, $\sigma(f)$ represents the seismic subwave spectrum obtained by Fourier transform of $\sigma(t)$, and $H(f)$ and $A(f)$ are to-be-solved polynomials of a frequency f for fitting a seismic subwave amplitude spectrum;

step A600, obtaining a maximum phase component and a minimum phase component of a subwave based on the simulated seismic subwave amplitude spectrum, wherein let the maximum phase component and the minimum phase component of the subwave $\sigma(t_{theo})$ as $u(t_{theo})$ and $v(t_{theo})$, then the subwave $\sigma(t_{theo})$ is:

$$\sigma(t_{theo})=u(t_{theo}) \cdot v(t_{theo}),$$

a representation in the cepstrum of the amplitude spectrum is:

$$2\widetilde{\sigma_g}(t_{theo})=\tilde{u}(t_{theo})+\tilde{v}(t_{theo})+\tilde{u}(-t_{theo})+\tilde{v}(-t_{theo}),$$

wherein the cepstrum $\widetilde{\sigma_g}(t_{theo})$ of the amplitude spectrum is symmetrically displayed on positive and negative axes of the cepstrum, $\tilde{v}(-t_{theo})$ is a cepstrum of a maximum phase function corresponding to the minimum phase component $v(t_{theo})$ of seismic subwave, and $\tilde{u}(-t_{theo})$ is a cepstrum of a minimum phase function corresponding to the maximum phase component $u(t_{theo})$ of the seismic subwave;

step A700, determining a set of a mixed phase subwave sets with a same amplitude spectrum based on the cepstrum of the amplitude spectrum, adjusting a Yu subwave parameter, and obtaining, by increasing an effective bandwidth to a preset bandwidth threshold, shaped waveform data on the premise of ensuring the integrity of a dominant frequency of the seismic subwave;

step A800, constructing a tensor diffusion model based on the shaped waveform data:

$$\begin{cases} \dfrac{\partial U}{\partial \tau} = \mathrm{div}(D \cdot \nabla U) \\ U|_{\tau=0} = U_o \end{cases},$$

wherein $\tau$ represents a diffusion time, div represents a divergence operator, D represents a diffusion tensor, U represents a diffusion filtering result, $U|_{\tau=0}$ represents a diffusion filtering result when $\tau=0$. $U_0$ represents the shaped waveform data at the time of $\tau=0$, serving as an initial condition of the tensor diffusion model, and $\nabla U$ represents a gradient of the diffusion filtering result; and constructing a gradient structure tensor based on the tensor diffusion model:

$$J_\rho(\nabla U)=G_\rho * J_0=G_\rho*(\nabla U(\nabla U)^T),$$

wherein U represents the diffusion filtering result, $J_0$ represents a gradient vector tensor product, and $G_\rho$ represents a Gaussian function with a scale of $\rho$:

$$G_\rho(r)=(2\pi\rho^2)^{-3/2}\exp(-|r|^2/(2\rho^2)),$$

wherein r represents a computational radius;

a feature vector of the structure tensor is:

$$J_\rho(\nabla U) = (v_1\ v_2\ v_3) \begin{pmatrix} \xi_1 & 0 & 0 \\ 0 & \xi_2 & 0 \\ 0 & 0 & \xi_3 \end{pmatrix} (v_1\ v_2\ v_3)^T,$$

wherein $v_1$, $v_2$ and $v_3$ represent 3 feature vectors of the gradient structure tensor, considered as a local orthogonal coordinate system; $v_1$ directs to a gradient direction of the seismic signal; a plane consisting of $v_2$ and $v_3$ is parallel to a local structure feature of the seismic signal; and $\xi_1$, $\xi_2$ and $\xi_3$ are three feature values corresponding to $v_1$, $v_2$ and $v_3$;

step A900, computing a linear structure confidence measure, a planar structure confidence measure and a diffusion tensor separately based on the feature vector of the structure tensor, wherein the linear structure confidence measure $C_{line}$ is:

$$C_{line}=\frac{\xi_2-\xi_3}{\xi_2+\xi_3}.$$

the planar structure confidence measure $C_{plane}$ is:

$$C_{plane}=\frac{\xi_1-\xi_2}{\xi_1+\xi_2},$$

the diffusion tensor D is:

$$D = \begin{pmatrix} v_1 & v_2 & v_3 \end{pmatrix} \begin{pmatrix} \mu_1 & 0 & 0 \\ 0 & \mu_2 & 0 \\ 0 & 0 & \mu_3 \end{pmatrix} \begin{pmatrix} v_1 & v_2 & v_3 \end{pmatrix}^T = \begin{pmatrix} D_{11} & D_{12} & D_{13} \\ D_{21} & D_{22} & D_{23} \\ D_{31} & D_{32} & D_{33} \end{pmatrix},$$

wherein $\mu_1$, $\mu_1$ and $\mu_3$ represent three non-negative feature values of the diffusion tensor, representing filtering strengthens of a diffusion filter in three feature directions $v_1$, $v_2$ and $v_3$ respectively; and step A1000, obtaining, by repeating steps A100-A900 until a preset number of iterations is reached, the diffusion filtering result, i.e. the pre-processed seismic data.

In some preferred implementations, a method for obtaining the standardized logging data specifically includes:

step B10, using the original logging data as a to-be-processed data set X;

step B20, forming, by randomly extracting φ data points from the to-be-processed data set X, a to-be-processed data subset, and storing the to-be-processed data subset X' in a root node;

step B30, randomly selecting a dimension q from the to-be-processed data set X, and making the dimension q randomly generate a split point p, wherein the split point p satisfies $\min(x_{ij}: j=q, x_{ij} \in X') < p < \max(x_{ij}, j=q, x_{ij} \in X')$, j represents a split point number, and i represents a data type;

step B40, generating a hyperplane that divides the data in the dimension q into two subspaces according to the generation of the split point p, and designating the data points, with a value smaller than p, in the dimension q to be placed in a first leaf node and the data points, with a value larger than or equal to p, in the dimension q to be placed in a second leaf node;

step B50, performing recursion on methods described in steps B30-B40 until all leaf nodes have only one data point or an isolated tree that has reached a preset height;

step B60, repeating steps B30-B50 until T isolated trees are generated, wherein the T isolated trees represent: the isolated trees have no external node of the leaf node, or have two leaf nodes $\{T_l, T_r\}$ and an internal node test; the internal node test of the T isolated trees consists of the dimension q and the split point p; and the points satisfying q<p belong to $T_l$, and the others belong to $T_r$;

step B70, the T isolated trees being an isolated tree forest, letting each data point $x_i$ traverse each isolated tree, and computing a number of the data points $x_i$ at a height $h(x_i)$ of each isolated tree, i.e. edges of the data points $x_i$ passing from the root nodes of the located isolated trees to the leaf nodes; and then, computing an average height of the data points $x_i$ in the isolated tree forest, and obtaining, by normalizing an average height of all the data points, a normalized average height $\overline{h(x_i)}$ of the data points;

step B80, computing an outlier score $s(x,\varphi)$ based on the normalized average height $\overline{h(x_i)}$ of the data points:

$$s(x,\varphi) = 2^{\frac{E(\overline{h(x_i)})}{c(\varphi)}},$$

wherein $\overline{c(\varphi)}$ represents an average value of a path length of a binary tree constructed by φ data points, and E(*) represents an expectation;

$$\overline{c(\varphi)} = \begin{cases} 2H(\varphi-1) - \dfrac{2(\varphi-1)}{\varphi}, & \varphi > 2 \\ 1, & \varphi = 2 \\ 0, & \varphi < 2 \end{cases},$$

wherein H(i) represents a harmonic number, estimated by means of ln(i)+0.5772156649, and 0.57721566490 is an Euler constant; and when the outlier score $s(x, \varphi)$ is smaller than a preset outlier threshold s, the corresponding data points are eliminated to obtain logging data $C=\{c_1, \ldots, c_\alpha, \ldots, c_m\}$, $1 \leq \alpha \leq m$, $c_\alpha \in C$ and m with outliers eliminated, representing the number of the data points with the outliers eliminated in the logging data; and step B90, standardizing the continuous logging data with the outliers deleted to obtain the standardized logging data:

$$c_Z = \frac{(g_z - \text{Average}(g))}{v},$$

wherein $g_z$ represents the zth sampling point data value of the logging data with the outliers deleted; Average represents a computing average value; g represents all data sample points of the logging data with the outliers deleted; v represents a variance of the logging data with the outliers deleted; and $c_z$ represents the zth sampling point data value of the standardized logging data with the outliers deleted.

A method for obtaining the frequency-divided seismic data comprises:

designing, according to the pre-processed seismic data, a processed wavelet basis function better matching with the pre-processed seismic data based on a Mollet wavelet basis function:

$$\psi_g(t) = \frac{k}{\sqrt{2\pi}\sigma^3} e^{-\frac{t^2}{2\sigma^2} + \omega 2\pi\mu t} \left(1 - \frac{t^2}{\sigma^2} + 4\pi^2\mu^2\sigma^2 + \omega 4\pi\mu t\right),$$

wherein $\psi_g$ represents the wavelet basis function, t represents a time, k represents a variable making the processed wavelet basis function satisfy a normalization condition, σ represents an interval of a time-frequency two-dimensional resolution, μ represents a constant controlling a center position of a frequency after wavelet transformation, and ω represents an imaginary unit;

letting the processed wavelet basis function satisfy the normalization condition $\|\psi_g\|^2 = 1$, and the is $$k = \sqrt{2\sigma} \pi^{\frac{1}{4}} \left(\mu^4 + \frac{48\mu^2\sigma^2\pi^2 + 3}{64\sigma^4\pi^4}\right)^{-\frac{1}{2}},$$

inputting all seismic channel data, and performing frequency division transformation on a seismic channel by means of the processed wavelet basis function to obtain the frequency-divided seismic data $W^g$:

$$W^g(a, b) = \frac{2a^2 k_2}{f_p^3 \sqrt{\alpha}} e^{-2\sigma^2 \pi^2 \mu^2 + \frac{\beta^2}{4\alpha}} \left( \left( \frac{\beta}{2\alpha} \right)^4 + \frac{3}{\alpha} \left( \frac{\beta}{2\alpha} \right)^2 + 3 \left( \frac{1}{2\alpha} \right)^2 \right),$$

a represents a scale factor, b represents a time-shift factor, $W^g(a, b)$ represents amplitude values of a specific frequency a and a specific time b, $f_p$ represents a frequency of a wavelet basis, and α and β are distributed parameters in normal distribution $$N\left( \frac{\beta}{2\alpha}, \frac{1}{2\alpha} \right)$$

respectively;

In some preferred implementations, step S400 specifically includes:

step S410, determining three-dimensional surface curved data of the target horizon $t_1(x,y)$ as the time window top three-dimensional surface according to the historical geological data;

step S420, determining a dominant frequency f (Hz) of the target horizon according to the pre-processed seismic data;

step S430, computing a complete seismic wave length based on the dominant frequency of the target horizon: $\Delta t=1/f(s)$;

step S440, obtaining the time window bottom three-dimensional curved surface by means of downward continuation of Δt according to the time window top three-dimensional surface.

In some preferred implementations, the extracting a borehole-side pre-drilling full-band gamma ray prediction curve specifically includes:

letting n be a number of times of the current drilling trajectory;

when n>1, extracting a three-dimensional coordinate, designed by the nth drilling, of the $(n+1)^{th}$ drilling well trajectory, and extracting the $(n+1)^{th}$ frequency division gamma ray prediction curve while drilling from the $(n+1)^{th}$ pre-drilling prediction frequency division gamma ray distribution model updated by the nth drilling according to the three-dimensional coordinate of the $(n+1)^{th}$ drilling trajectory;

when n=1, extracting a three-dimensional coordinate of the first drilling trajectory, and extracting the full-band gamma ray prediction curve from the pre-drilling prediction full-band gamma ray distribution model according to the three-dimensional coordinate of the first drilling trajectory.

In some preferred implementations, the compute a correlation coefficient between the borehole-side pre-drilling full-band gamma ray prediction curve and a gamma ray curve measured by a real drilling instrument specifically includes:

when n>1, computing the correlation coefficient between the $(n+1)^{th}$ frequency division gamma ray prediction curve while drilling updated by the nth drilling and the gamma ray curve measured by the real drilling instrument in $(n+1)^{th}$ drilling; and when n=1, computing the correlation coefficient between the full-band gamma ray prediction curve and the gamma ray curve measured by the real drilling instrument in first drilling.

In some preferred implementations, step S1200 specifically includes:

when n=1, obtaining, by the method in steps S400-S600, a frequency division gamma ray distribution model while drilling, updated by drilling in second drilling, and a full-band gamma ray distribution model updated by drilling in second drilling according to the gamma ray curve measured by the real drilling instrument in first drilling and the seismic data corresponding to the single frequency currently selected in first drilling; and when n>1, obtaining, by the method in steps S400-S600, a frequency division gamma ray distribution model while $(n+1)^{th}$ drilling, updated by nth drilling, and an $(n+1)^{th}$ full-band gamma ray distribution model updated while drilling in nth drilling according to the gamma ray curve measured by the real drilling instrument in $(n+1)^{th}$ drilling and the seismic data corresponding to the single frequency currently selected in $(n+1)^{th}$ drilling.

In another aspect of the present disclosure, a system for updating a three-dimensional lithology model for precision navigation of deep oil and gas in real time, including:

a data acquisition and pre-processing module, configured to collect original seismic data and original logging data, and pre-process the original seismic data to obtain pre-processed seismic data, the original logging data including multi-well gamma ray logging data;

a standardization module, configured to perform, based on the original logging data, outlier processing by means of an isolated forest algorithm to obtain logging data with outliers deleted, the logging data with the outliers deleted including gamma ray parameters with outliers deleted; and to standardize the logging data with the outliers deleted to obtain standardized logging data, the standardized logging data including standardized gamma ray parameters;

a data frequency division module, configured to perform, based on the pre-processed seismic data, frequency division processing by means of a processed wavelet basis function to obtain frequency-divided seismic data, the frequency-divided seismic data including three types of single-frequency seismic waveform data, i.e. low-frequency seismic data, intermediate-frequency seismic data, and high-frequency seismic data;

a three-dimensional time window division module, configured to determine a time window top three-dimensional curved surface and a time window bottom three-dimensional surface of a stratum according to a three-dimensional surface of a target horizon and visual seismic data;

a waveform clustering module, configured to obtain a clustering result of single-frequency seismic waveform data in a time window of the stratum by means of a clustering algorithm according to the frequency-divided seismic data and the time window top three-dimensional curved surface and the time window bottom three-dimensional surface of the stratum;

a frequency-divided inversion module, configured to obtain frequency-divided inversion data bodies of the gamma ray parameters by performing a waveform indication inversion algorithm on the clustering result of the single-frequency seismic waveform data in the time window of the stratum, the standardized gamma ray parameters and clustering results of a corresponding well depth, well location information and single-frequency seismic waveform data in the time window of the stratum of the standardized gamma ray parameters;

a pre-drilling frequency division gamma ray prediction model acquisition module, configured to use the frequency-divided inversion data bodies of the gamma ray parameters as pre-drilling prediction frequency division gamma ray distribution models;

a lithology prediction model acquisition module, configured to obtain a pre-drilling prediction full-band gamma ray distribution model by superimposing the pre-drilling prediction frequency division gamma ray distribution models, determine a threshold value of the pre-drilling prediction full-band gamma ray distribution model according to a logging lithology interpretation, discriminate lithology, and establish a current pre-drilling lithology prediction model;

a well trajectory planning module, configured to plan a current well trajectory based on the pre-drilling lithology prediction model;

a current single frequency selection module, configured to extract a three-dimensional coordinate of the current well trajectory and a borehole-side pre-drilling full-band gamma ray prediction curve or a frequency division gamma ray prediction curve while drilling from the pre-drilling full-band gamma ray distribution model, compute a correlation coefficient between the borehole-side pre-drilling full-band gamma ray prediction curve and a gamma ray curve measured by a real drilling instrument, or a correlation coefficient between the frequency division gamma ray prediction curve while drilling and the gamma ray curve measured by the real drilling instrument, and select a combination of single-frequency seismic waveform data with the highest correlation coefficient as a currently selected single-frequency combination;

a model updating module, configured to compute a single-frequency gamma ray prediction model while drilling, updated by drilling, and a frequency division gamma ray distribution model while drilling, updated by drilling, according to the frequency-divided inversion data bodies of the gamma ray parameters corresponding to the currently selected single-frequency combination and the gamma ray curve measured by the real drilling instrument; and a circulation drilling module, configured to replace the pre-drilling prediction frequency division gamma ray distribution model with the frequency division gamma ray distribution model while drilling, updated by drilling, and repeat the methods in the lithology prediction model acquisition module, the well trajectory planning module, the current single frequency selection module and the model updating module until a drilling task is completed.

The present disclosure has the beneficial effects that:

(1) By improving wavelet transform spectrum decomposition, the present disclosure is more suitable for frequency division of the seismic signal, thereby improving the accuracy of subsequent frequency division modeling.

(2) By combining the wavelet frequency division algorithm with the waveform indication inversion algorithm, the present disclosure can clarify best single-frequency data combinations at different depths, so that the model has better adaptability and improves the prediction accuracy of the gamma ray curve.

BRIEF DESCRIPTION OF DRAWINGS

Other features, objectives, and advantages of the present application will become more apparent by reading the detailed description on non-limiting embodiments made with reference to the following accompanying drawings.

DETAILED DESCRIPTION OF THE EMBODIMENTS

The present application will be further described in detail below with reference to the accompanying drawings and the embodiments. It may be understood that the specific embodiments described herein are merely used to explain the related invention, rather than limit the present disclosure. In addition, it should also be noted that only parts related to the present disclosure are shown in the accompanying drawings for ease of description.

It should be noted that the embodiments in the present application and features in the embodiments can be combined without conflicts. The present application will be described below in details with reference to the accompanying drawings and embodiments.

Figure 1A:
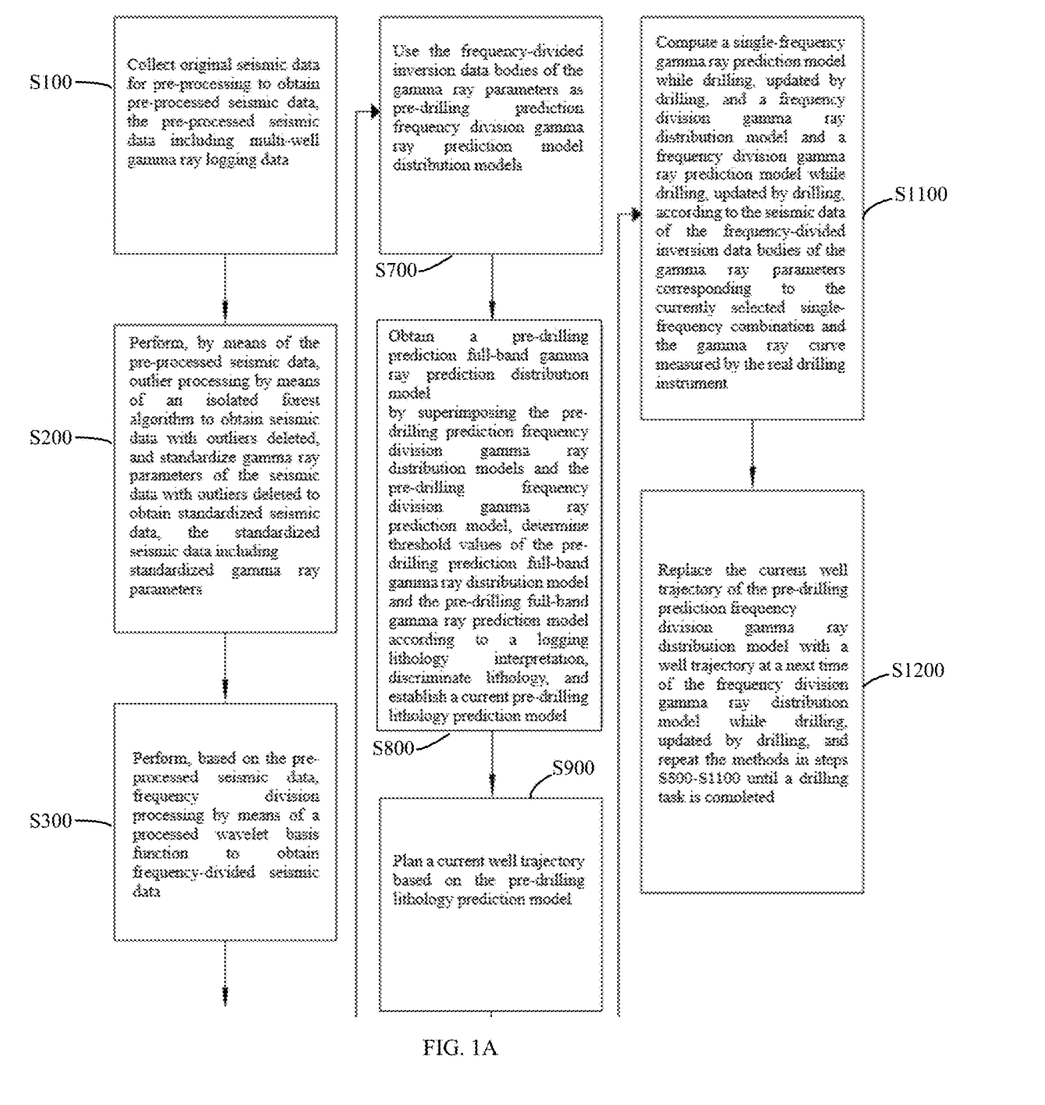
FIG. 1A and FIG. 1B is a flow chart of a method for updating a three-dimensional lithology model for precision navigation of deep oil and gas in real time according to the present disclosure.
Figure 1B:
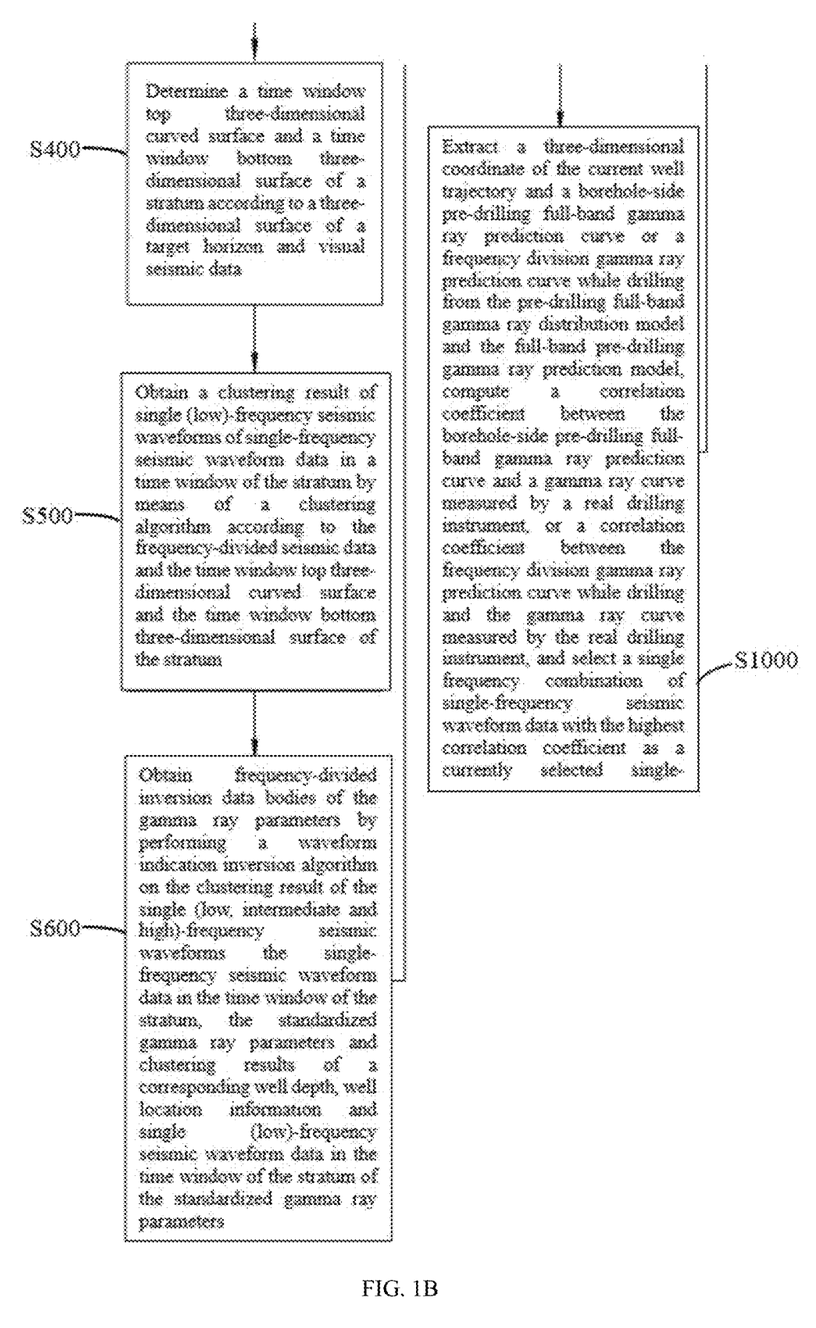

In order to more clearly explain a method for updating a three-dimensional lithology model for precision navigation of deep oil and gas in real time of the present disclosure, the following steps of the embodiments of the present disclosure are described in detail in combination with FIG. 1.

In a first embodiment of the present disclosure, a method for updating a three-dimensional lithology model for precision navigation of deep oil and gas in real time includes steps S100-S1300, which are described in detail as follows:

step S100, collecting original seismic data and original logging data, and pre-processing the original seismic data to obtain pre-processed seismic data, the original logging data comprising multi-well gamma ray logging data.

In this embodiment, the pre-processing specifically includes:

step A100, expressing a seismic record convolution model of the original seismic data in a frequency domain as:

$$s(\omega)=\sigma(\omega)\varepsilon(\omega)$$

wherein $s(\omega)$ represents a seismic record spectrum after Fourier transform, $\sigma(\omega)$ represents a seismic subwave spectrum after Fourier transform, $\varepsilon(\omega)$ represents a reflection coefficient spectrum after Fourier transform, and W represents an angle frequency;

step A200, transforming a representation of the seismic record convolution model in the frequency domain into a representation of a frequency domain of a seismic record linear system:

$$lns(\omega)=ln\sigma(\omega)+ln\varepsilon(\omega)$$

wherein $lns(\omega)$ is the representation of the frequency domain of the seismic record linear system, $ln\sigma(\omega)$ is a representation of a frequency domain of a seismic subwave linear system, and $\ln\varepsilon(\omega)$ is a representation of a frequency domain of a reflection coefficient linear system;

step A300, obtaining, by performing inverse Fourier transform on the representation of the frequency domain of the seismic record linear system, a cepstrum sequence of the seismic record spectrum:

$$\tilde{s}(t)=\tilde{\sigma}(t)+\tilde{\varepsilon}(t),$$

wherein $\tilde{s}(t)$ represents the cepstrum sequence of the seismic record spectrum, $\tilde{\sigma}(t)$ represents a cepstrum sequence of the seismic subwave spectrum, $\tilde{\varepsilon}(t)$ represents a cepstrum sequence of the reflection coefficient spectrum, and t represents a seismic arrival-time;

step A400, separating a subwave cepstrum sequence and a reflection coefficient cepstrum sequence in a cepstrum by means of a low-pass filter, and extracting a subwave amplitude;

step A500, simulating a seismic subwave amplitude by means of a least square method based on the subwave amplitude:

$$\sigma(f)=A(f)f^{\alpha}e^{H(f)},$$

wherein $\alpha$ represents a constant larger than or equal to 0, $\sigma(f)$ represents the seismic subwave spectrum obtained by Fourier transform of $\sigma(t)$, and $H(f)$ and $A(f)$ are to-be-solved polynomials of a frequency f for fitting a seismic subwave amplitude spectrum;

step A600, obtaining a maximum phase component and a minimum phase component of a subwave based on the simulated seismic subwave amplitude spectrum, wherein let the maximum phase component and the minimum phase component of the subwave $\sigma(t_{theo})$ as $u(t_{theo})$ and $v(t_{theo})$, then the subwave $\sigma(t_{theo})$ is:

$$\sigma(t_{theo})=u(t_{theo})\cdot v(t_{theo}).$$

a representation in the cepstrum of the amplitude spectrum is:

$$2\widetilde{\sigma_{\delta}}(t_{theo})=\tilde{u}(t_{theo})+\tilde{v}(t_{theo})+\tilde{u}(-t_{theo})+\tilde{v}(-t_{theo}),$$

wherein the cepstrum $\widetilde{\sigma_{\delta}}(t_{theo})$ of the amplitude spectrum is symmetrically displayed on positive and negative axes of the cepstrum, $\tilde{v}(-t_{theo})$ is a cepstrum of a maximum phase function corresponding to the minimum phase component $v(t_{theo})$ of seismic subwave, and $\tilde{u}(-t_{theo})$ is a cepstrum of a minimum phase function corresponding to the maximum phase component $u(t_{theo})$ of the seismic subwave;

step A700, determining a set of a mixed phase subwave sets with a same amplitude spectrum based on the cepstrum of the amplitude spectrum, adjusting a Yu subwave parameter, and obtaining, by increasing an effective bandwidth to a preset bandwidth threshold, shaped waveform data on the premise of ensuring the integrity of a dominant frequency of the seismic subwave;

step A800, constructing a tensor diffusion model based on the shaped waveform data:

$$\begin{cases} \dfrac{\partial U}{\partial \tau}=div(D\cdot\nabla U), \\ U|_{\tau=0}=U_0 \end{cases}$$

wherein $\tau$ represents a diffusion time, div represents a divergence operator, D represents a diffusion tensor, $U$ represents a diffusion filtering result, $U|_{\tau=0}$ represents a diffusion filtering result when $\tau=0$, $U_0$ represents the shaped waveform data at the time of $\tau=0$, serving as an initial condition of the tensor diffusion model, and $\nabla U$ represents a gradient of the diffusion filtering result; and constructing a gradient structure tensor based on the tensor diffusion model:

$$J_\rho(\nabla U)=G_\rho * J_0=G_\rho * (\nabla U(\nabla U)^T),$$

wherein U represents the diffusion filtering result, $J_0$ represents a gradient vector tensor product, and $G_\rho$ represents a Gaussian function with a scale of $\rho$:

$$G_\rho(r)=(2\pi\rho^2)^{-3/2}\exp(-|r|^2/(2\rho^2)),$$

wherein r represents a computational radius;
a feature vector of the structure tensor is:

$$J_\rho(\nabla U)=(v_1\ v_2\ v_3)\begin{pmatrix}\xi_1 & 0 & 0 \\ 0 & \xi_2 & 0 \\ 0 & 0 & \xi_3\end{pmatrix}(v_1\ v_2\ v_3)^T,$$

wherein $v_1$, $v_2$ and $v_3$ represent 3 feature vectors of the gradient structure tensor, considered as a local orthogonal coordinate system; $v_1$ directs to a gradient direction of the seismic signal; a plane consisting of $v_2$ and $v_3$ is parallel to a local structure feature of the seismic signal; and $\xi_1$, $\xi_2$ and $\xi_3$ are three feature values corresponding to $v_1$, $v_2$ and $v_3$;

step A900, computing a linear structure confidence measure, a planar structure confidence measure and a diffusion tensor separately based on the feature vector of the structure tensor, wherein
the linear structure confidence measure $C_{line}$ is:

$$C_{line}=\frac{\xi_2-\xi_3}{\xi_2+\xi_3},$$

the planar structure confidence measure $C_{plane}$ is:

$$C_{plane}=\frac{\xi_1-\xi_2}{\xi_1+\xi_2},$$

the diffusion tensor D is:

$$D=(v_1\ v_2\ v_3)\begin{pmatrix}\mu_1 & 0 & 0 \\ 0 & \mu_2 & 0 \\ 0 & 0 & \mu_3\end{pmatrix}(v_1\ v_2\ v_3)^T=\begin{pmatrix}D_{11} & D_{12} & D_{13} \\ D_{21} & D_{22} & D_{23} \\ D_{31} & D_{32} & D_{33}\end{pmatrix},$$

wherein $\mu_1$, $\mu_2$ and $\mu_3$ represent three non-negative feature values of the diffusion tensor, representing filtering strengthens of a diffusion filter in three feature directions $v_1$, $v_2$ and $v_3$ respectively; and step A1000, obtaining, by repeating steps A100-A900 until a preset number of iterations is reached, the diffusion filtering result. i.e. the pre-processed seismic data.

step S200, performing, based on the original logging data, outlier processing by means of an isolated forest algorithm to obtain logging data with outliers deleted, the logging data with the outliers deleted comprising gamma ray parameters with outliers deleted; and standardizing the logging data with the outliers deleted to obtain standardized logging data, the standardized logging data including standardized gamma ray parameters.

A method for obtaining the standardized logging data specifically includes:

step B10, using the original logging data as a to-be-processed data set X;

step B20, forming, by randomly extracting $\varphi$ data points from the to-be-processed data set X, a to-be-processed data subset X', and storing the to-be-processed data subset in a root node;

step B30, randomly selecting a dimension q from the to-be-processed data set X, and making the dimension q randomly generate a split point p, wherein the split point p satisfies $\min(x_{ij},j=q,x_{ij}\in X')<p<\max(x_{ij},j=q,x_{ij}\in X')$, j represents a split point number, and i represents a data type;

step B40, generating a hyperplane that divides the data in the dimension q into two subspaces according to the generation of the split point p, and designating the data points, with a value smaller than p, in the dimension q to be placed in a first leaf node and the data points, with a value larger than or equal to p, in the dimension q to be placed in a second leaf node;

step B50, performing recursion on methods described in steps B30-B40 until all leaf nodes have only one data point or an isolated tree that has reached a preset height;

step B60, repeating steps B30-B50 until T isolated trees are generated, wherein the T isolated trees represent: the isolated trees have no external node of the leaf node, or have two leaf nodes $\{T_l, T_r\}$ and an internal node test; the internal node test of the T isolated trees consists of the dimension q and the split point p; and the points satisfying q<p belong to $T_l$, and the others belong to $T_r$;

step B70, the T isolated trees being an isolated tree forest, letting each data point $x_i$ traverse each isolated tree, and computing a number of the data points $x_i$ at a height $h(x_i)$ of each isolated tree, i.e. edges of the data points $x_i$ passing from the root nodes of the located isolated trees to the leaf nodes; and then, computing an average height of the data points $x_i$ in the isolated tree forest, and obtaining, by normalizing an average height of all the data points, a normalized average height $\overline{h(x_i)}$ of the data points;

step B80, computing an outlier score $s(x,\varphi)$ based on the normalized average height $\overline{h(x_i)}$ of the data points:

$$s(x, \varphi) = 2^{\frac{E(\overline{h(x_1)})}{\overline{c(\varphi)}}},$$

wherein $\overline{c(\varphi)}$ represents an average value of a path length of a binary tree constructed by $\varphi$ data points, and $E(*)$ represents an expectation:

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases}$$

wherein H(i) represents a harmonic number, estimated by means of $\ln(i)+0.5772156649$, and 0.57721566490 is an Euler constant; and when the outlier score $s(x, \varphi)$ is smaller than a preset outlier threshold s, the corresponding data points are eliminated to obtain logging data $C=\{c_1, \ldots, c_\alpha, \ldots, c_m\}$, $1 \leq \alpha \leq m$, $c_\alpha \in C$ and M with outliers eliminated, representing the number of the data points with the outliers eliminated in the logging data; and step B90, standardizing the continuous logging data with the outliers deleted to obtain the standardized logging data:

$$c_Z = \frac{(g_z - \text{Average}(g))}{v},$$

wherein $g_z$ represents the zth sampling point data value of the logging data with the outliers deleted; Average represents a computing average value; g represents all data sample points of the logging data with the outliers deleted; V represents a variance of the logging data with the outliers deleted; and $c_z$ represents the zth sampling point data value of the standardized logging data with the outliers deleted.

step S300, performing, based on the pre-processed seismic data, frequency division processing by means of a processed wavelet basis function to obtain frequency-divided seismic data, the frequency-divided seismic data including three types of single-frequency seismic waveform data, i.e. low-frequency seismic data, intermediate-frequency seismic data, and high-frequency seismic data.

In this embodiment, a method for obtaining the frequency-divided seismic data includes:

designing, according to the pre-processed seismic data a processed wavelet basis function better matching with the pre-processed seismic data based on a Mollet wavelet basis function:

$$\psi_g(t) = \frac{k}{\sqrt{2\pi}\sigma^3} e^{-\frac{t^2}{2\sigma^2} + \omega 2\pi\mu t} \left(1 - \frac{t^2}{\sigma^2} + 4\pi^2\mu^2\sigma^2 + \omega 4\pi\mu t\right),$$

wherein $\psi_g$ represents the wavelet basis function, t represents a time, k represents a variable making the processed wavelet basis function satisfy a normalization condition, $\sigma$ represents an interval of a time-frequency two-dimensional resolution, $\mu$ represents a constant controlling a center position of a frequency after wavelet transformation, and $\omega$ represents an imaginary unit;

letting the processed wavelet basis function satisfy the normalization condition $\|\psi_g\|^2 = 1$, and there is $$k = \sqrt{2\sigma}\pi^{\frac{1}{4}}\left(\mu^4 + \frac{48\mu^2\sigma^2\pi^2 + 3}{64\sigma^4\pi^4}\right)^{-\frac{1}{2}},$$

inputting all seismic channel data, and performing frequency division transformation on a seismic channel by means of the processed wavelet basis function to obtain the frequency-divided seismic data $W^g$:

$$W^g(a, b) = \frac{2a^2 k_2}{f_p^3 \sqrt{\alpha}} e^{-2\sigma^2\pi^2\mu^2 + \frac{\beta^2}{4\alpha}}\left(\left(\frac{\beta}{2\alpha}\right)^4 + \frac{3}{\alpha}\left(\frac{\beta}{2\alpha}\right)^2 + 3\left(\frac{1}{2\alpha}\right)^2\right),$$

a represents a scale factor, b represents a time-shift factor, $W^g(a, b)$ represents amplitude values of a specific frequency a and a specific time b, $f_p$ represents a frequency of a wavelet basis, and $\alpha$ and $\beta$ are distributed parameters in normal distribution $$N\left(\frac{\beta}{2\alpha}, \frac{1}{2\alpha}\right)$$

respectively;

step S400, determining a time window top three-dimensional curved surface and a time window bottom three-dimensional surface of a stratum according to a three-dimensional surface of a target horizon and visual seismic data.

Figure 2:
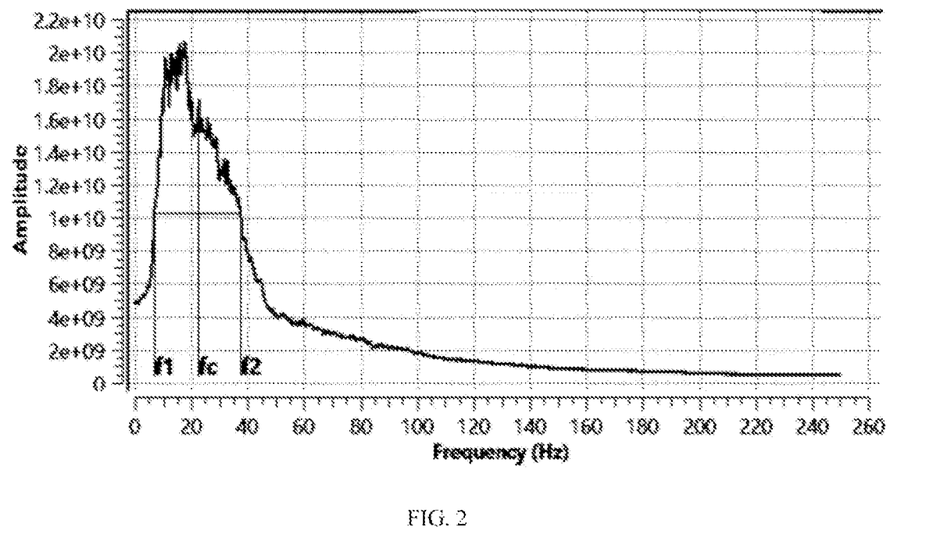
FIG. 2 is a schematic diagram of a principle of determining a dominant frequency of a target horizon according to pre-processed seismic data.

In this embodiment, the step S400 specifically includes:

step S410, determining three-dimensional surface curved data of the target horizon $t_1(x,y)$ as the time window top three-dimensional surface according to the historical geological data;

step S420, as shown in FIG. 2, determining a dominant frequency f (Hz) of the target horizon according to the pre-processed seismic data. In FIG. 2, the dominant frequency corresponding to a time resolution of 19.3 ms, a center frequency of 22.5 Hz, an absolute bandwidth of 31.0 Hz, a relative bandwidth of 2.5 db, and a signal-to-noise ratio of 0.83 is selected.

step S430, computing a complete seismic wave length based on the dominant frequency of the target horizon: $\Delta t = 1/f(s)$.

step S440, obtaining the time window bottom three-dimensional curved surface by means of downward continuation of $\Delta t$ according to the time window top three-dimensional surface.

step S500, obtaining a clustering result of single-frequency seismic waveform data in a time window of the stratum by means of a clustering algorithm according to the frequency-divided seismic data and the time window top three-dimensional curved surface and the time window bottom three-dimensional surface of the stratum.

step S600, obtaining frequency-divided inversion data bodies of the gamma ray parameters by performing a waveform indication inversion algorithm on the clustering result of the single-frequency seismic waveform data in the time window of the stratum, the standardized gamma ray parameters and clustering results of a corresponding well depth, well location information and single-frequency seismic waveform data in the time window of the stratum of the standardized gamma ray parameters.

step S700, using the frequency-divided inversion data bodies of the gamma ray parameters as pre-drilling prediction frequency division gamma ray distribution models;

step S800, obtaining a pre-drilling prediction full-band gamma ray distribution model by superimposing the pre-drilling prediction frequency division gamma ray distribution models, determining a threshold value of the pre-drilling prediction full-band gamma ray distribution model according to a logging lithology interpretation, discriminating lithology, and establishing a current pre-drilling lithology prediction model;

step S900, planning a current well trajectory based on the pre-drilling lithology prediction model.

step S1000, extracting a three-dimensional coordinate of the current well trajectory and a borehole-side pre-drilling full-band gamma ray prediction curve or a frequency division gamma ray prediction curve while drilling from the pre-drilling full-band gamma ray distribution model, computing a correlation coefficient between the borehole-side pre-drilling full-band gamma ray prediction curve and a gamma ray curve measured by a real drilling instrument, or a correlation coefficient between the frequency division gamma ray prediction curve while drilling and the gamma ray curve measured by the real drilling instrument, and selecting a combination of single-frequency seismic waveform data with the highest correlation coefficient as a currently selected single-frequency combination.

In this embodiment, the extracting a borehole-side pre-drilling full-band gamma ray prediction curve specifically includes:

letting n be a number of times of the current drilling trajectory;

when n>1, extracting a three-dimensional coordinate, designed by the nth drilling, of the (n+1)th drilling well trajectory, and extracting the (n+1)th frequency division gamma ray prediction curve while drilling from the (n+1)th pre-drilling prediction frequency division gamma ray distribution model updated by the nth drilling according to the three-dimensional coordinate of the (n+1)th drilling trajectory;

when n=1, extracting a three-dimensional coordinate of the first drilling trajectory, and extracting the full-band gamma ray prediction curve from the pre-drilling prediction full-band gamma ray distribution model according to the three-dimensional coordinate of the first drilling trajectory.

In this embodiment, the compute a correlation coefficient between the borehole-side pre-drilling full-band gamma ray prediction curve and a gamma ray curve measured by a real drilling instrument specifically includes:

when n>1, computing the correlation coefficient between the (n+1)th frequency division gamma ray prediction curve while drilling updated by the nth drilling and the gamma ray curve measured by the real drilling instrument in (n+1)th drilling; and when n=1, computing the correlation coefficient between the full-band gamma ray prediction curve and the gamma ray curve measured by the real drilling instrument in first drilling.

step S1100, computing a frequency division gamma ray distribution model while drilling, updated by drilling, and a full-band gamma ray distribution model updated by drilling according to the frequency-divided inversion data bodies of the gamma ray parameters corresponding to the currently selected single-frequency combination and the gamma ray curve measured by the real drilling instrument.

In this embodiment, the step S1100 specifically includes:

when n=1, obtaining, by the method in steps S400-S600, a frequency division gamma ray distribution model while drilling, updated by drilling in second drilling, and a full-band gamma ray distribution model updated by drilling in second drilling according to the gamma ray curve measured by the real drilling instrument in first drilling and the seismic data corresponding to the single frequency currently selected in first drilling; and when n>1, obtaining, by the method in steps S400-S600, a frequency division gamma ray distribution model while (n+1)th drilling, updated by nth drilling, and an (n+1)th full-band gamma ray distribution model updated while drilling in nth drilling according to the gamma ray curve measured by the real drilling instrument in (n+1)th drilling and the seismic data corresponding to the single frequency currently selected in (n+1)th drilling.

step S1200, replacing the pre-drilling prediction frequency division gamma ray distribution model with the frequency division gamma ray distribution model while drilling, updated by drilling, and repeating the methods in steps S800-S1100 until a drilling task is completed.

While various steps are described in the above order in the above embodiments, those skilled in the art can understand that in order to achieve the effects of this embodiment, different steps do not have to be executed in this order, they can be executed simultaneously (in parallel) or in an inverted order, and these simple changes are within a scope of the protection of the present disclosure.

In a second embodiment of the present disclosure, a system for updating a three-dimensional lithology model for precision navigation of deep oil and gas in real time, including:

a data acquisition and pre-processing module, configured to collect original seismic data and original logging data, and pre-process the original seismic data to obtain pre-processed seismic data; and original logging data including multi-well gamma ray logging data;

a standardization module, configured to perform, by means of the original logging data, outlier processing by means of an isolated forest algorithm to obtain logging data with outliers deleted, the logging data with the outliers deleted including gamma ray parameters with outliers deleted; and to standardize the logging data with the outliers deleted to obtain standardized logging data, the standardized logging data including standardized gamma ray parameters;

a data frequency division module, configured to perform, based on the pre-processed seismic data, frequency division processing by means of a processed wavelet basis function to obtain frequency-divided seismic data, the frequency-divided seismic data including three types of single-frequency seismic waveform data, i.e. low-frequency seismic data, intermediate-frequency seismic data, and high-frequency seismic data;

a three-dimensional time window division module, configured to determine a time window top three-dimensional curved surface and a time window bottom three-dimensional surface of a stratum according to a three-dimensional surface of a target horizon and visual seismic data;

a waveform clustering module, configured to obtain a clustering result of single-frequency seismic waveform data in a time window of the stratum by means of a clustering algorithm according to the frequency-divided seismic data and the time window top three-dimensional curved surface and the time window bottom three-dimensional surface of the stratum;

a frequency-divided inversion module, configured to obtain frequency-divided inversion data bodies of the gamma ray parameters by performing a waveform indication inversion algorithm on the clustering result of the single-frequency seismic waveform data in the time window of the stratum, the standardized gamma ray parameters and clustering results of a corresponding well depth, well location information and single-frequency seismic waveform data in the time window of the stratum of the standardized gamma ray parameters;

a pre-drilling frequency division gamma ray prediction model acquisition module, configured to use the frequency-divided inversion data bodies of the gamma ray parameters as pre-drilling prediction frequency division gamma ray distribution models;

a lithology prediction model acquisition module, configured to obtain a pre-drilling prediction full-band gamma ray distribution model by superimposing the pre-drilling prediction frequency division gamma ray distribution models, determine a threshold value of the pre-drilling prediction full-band gamma ray distribution model according to a logging lithology interpretation, discriminate lithology, and establish a current pre-drilling lithology prediction model;

a well trajectory planning module, configured to plan a current well trajectory based on the pre-drilling lithology prediction model;

a current single frequency selection module, configured to extract a three-dimensional coordinate of the current well trajectory and a borehole-side pre-drilling full-band gamma ray prediction curve or a frequency division gamma ray prediction curve while drilling from the pre-drilling full-band gamma ray distribution model, compute a correlation coefficient between the borehole-side pre-drilling full-band gamma ray prediction curve and a gamma ray curve measured by a real drilling instrument, or a correlation coefficient between the frequency division gamma ray prediction curve while drilling and the gamma ray curve measured by the real drilling instrument, and select a combination of single-frequency seismic waveform data with the highest correlation coefficient as a currently selected single-frequency combination;

a model updating module, configured to compute a single-frequency gamma ray prediction model while drilling, updated by drilling, and a frequency division gamma ray distribution model while drilling, updated by drilling, according to the frequency-divided inversion data bodies of the gamma ray parameters corresponding to the currently selected single-frequency combination and the gamma ray curve measured by the real drilling instrument; and a circulation drilling module, configured to replace the pre-drilling prediction frequency division gamma ray distribution model with the frequency division gamma ray distribution model while drilling, updated by drilling, and repeat the methods in the lithology prediction model acquisition module, the well trajectory planning module, the current single frequency selection module and the model updating module until a drilling task is completed.

It will be apparent to those skilled in the art that the specific operation and relevant description of the described system may be referred to the corresponding process in the aforementioned method embodiments for the sake of convenience and conciseness of the description and will not be described again here.

It is to be noted that the system for updating the three-dimensional lithology model for precision navigation of the deep oil and gas in real time provided by the above-described embodiments are only described by the division of the functional modules described above. In practice application, the functions can be completed by distributing to different functions modules as needed, that is, the modules or the steps in the embodiments of the present disclosure are then divided and combined, for example, the modules of the above embodiments can be combined into one module, or further be divided into a plurality of sub-modules, to complete all or a part of the functions described above. The names of the modules and the steps involved in the embodiments of the present disclosure are only to distinguish various modules or steps, and should not be regarded as an improper limitation of the present disclosure.

It will be apparent to those skilled in the art that the specific operation and relevant description of the described storage devices and processing devices may be referred to the corresponding process in the aforementioned method embodiments for the sake of convenience and conciseness of the description and will not be described again here.

Those skilled in the art should appreciate that various exemplary modules and method steps described in combination with the embodiments disclosed herein can be implemented by electronic hardware, computer software or a combination of both. Programs corresponding to software modules and method steps can be placed in a random access memory (RAM), a memory, a read-only memory (ROM), an electrically programmable ROM, an electrically erasable programmable ROM, a register, a hard disk, a removable disk, a CD-ROM, or any other form of storage medium known in the technical field. In order to clearly illustrate interchangeability of electronic hardware and software, compositions and steps of the various examples have been generally described in terms of functionality in the description. Whether the functions are executed in electronic hardware or software depends on the specific application and design constraints of the technical solution. Those skilled in the art may use different methods to implement the described functions for each particular application, but such implementation should not be considered to be beyond the scope of the present disclosure.

The terms "first", "second", etc. are used to distinguish similar objects, not to describe or represent a specific order or sequence.

The terms "comprises" or any other similar term are intended to cover a non-exclusive inclusion, such that a process, a method, an article or a facility/device that comprises a list of elements does not include only those elements but can include other elements not expressly listed or include inherent elements to these processes, methods, articles or facilities/devices.

To this regard, the technical solutions of the present disclosure have been described in combination with the preferred implementations shown in the accompanying drawings. However, it will be readily understood by those persons skilled in the art that the scope of the protection of the present disclosure is obviously not limited to these specific implementations. Those skilled in the art can also make equivalent changes or substitutions without departing from the principle of the present disclosure, and the technical solutions after these changes or substitutions are within the scope of the protection of the present disclosure.

What is claimed is:

1. A method for updating a three-dimensional lithology model for precision navigation of deep oil and gas in real time, comprising:
   step S100, collecting original seismic data and original logging data, and pre-processing the original seismic data to obtain pre-processed seismic data, the original logging data comprising multi-well gamma ray logging data;
   step S200, performing, based on the original logging data, outlier processing by means of an isolated forest algorithm to obtain logging data with outliers deleted, the logging data with the outliers deleted comprising gamma ray parameters with outliers deleted; and
   standardizing the logging data with the outliers deleted to obtain standardized logging data, the standardized logging data comprising standardized gamma ray parameters;
   step S300, performing, based on the pre-processed seismic data, frequency division processing by means of a processed wavelet basis function to obtain frequency-divided seismic data, the frequency-divided seismic data comprising three types of single-frequency seismic waveform data, i.e., low-frequency seismic data, intermediate-frequency seismic data, and high-frequency seismic data,
   wherein a method for obtaining the frequency-divided seismic data comprises:
   designing, according to the pre-processed seismic data, a processed wavelet basis function better matching with the pre-processed seismic data based on a Mollet wavelet basis function:

$$\psi_g(t) = \frac{k}{\sqrt{2\pi}\,\sigma^3} e^{-\frac{t^2}{2\sigma^2} + \omega 2\pi\mu t}\left(1 - \frac{t^2}{\sigma^2} + 4\pi^2\mu^2\sigma^2 + \omega 4\pi\mu t\right),$$

wherein $\psi_g$ represents the wavelet basis function, t represents a time, k represents a variable making the processed wavelet basis function satisfy a normalization condition, $\sigma$ represents an interval of a time-frequency two-dimensional resolution, $\mu$ represents a constant controlling a center position of a frequency after wavelet transformation, $\omega$ represents an imaginary unit, $\pi$ represents a circular constant, and e represents a natural constant;

letting the processed wavelet basis function satisfy the normalization condition $\|\psi_g\|^2=1$, and there is $$k = \sqrt{2\sigma}\,\pi^{\frac{1}{4}}\left(\mu^4 + \frac{48\mu^2\sigma^2\pi^2 + 3}{64\sigma^4\pi^4}\right)^{-\frac{1}{2}};$$

inputting all seismic channel data, and performing frequency division transformation on a seismic channel by means of the processed wavelet basis function to obtain the frequency-divided seismic data $W^g$:

$$W^g(a,b) = \frac{2a^2 k_2}{f_p^3 \sqrt{\alpha}} e^{-2\sigma^2\pi^2\mu^2 + \frac{\beta^2}{4\alpha}}\left(\left(\frac{\beta}{2\alpha}\right)^4 + \frac{3}{\alpha}\left(\frac{\beta}{2\alpha}\right)^2 + 3\left(\frac{1}{2\alpha}\right)^2\right);$$

a represents a scale factor, b represents a time-shift factor, $W^g(a,b)$ represents amplitude values of a specific frequency a and a specific time b, $f_p$ represents a frequency of a wavelet basis, $k_2$ represents a variable making the processed wavelet basis function satisfy a normalization condition, and $\alpha$ and $\beta$ are distributed parameters in normal distribution $$N\left(\frac{\beta}{2\alpha}, \frac{1}{2\alpha}\right)$$

respectively, wherein N represents a normal distribution;

step S400, determining a time window top three-dimensional curved surface and a time window bottom three-dimensional surface of a stratum according to a three-dimensional surface of a target horizon and visual seismic data;

step S500, obtaining a clustering result of single-frequency seismic waveform data in a time window of the stratum by means of a clustering algorithm according to the frequency-divided seismic data and the time window top three-dimensional curved surface and the time window bottom three-dimensional surface of the stratum;

step S600, obtaining frequency-divided inversion data bodies of the gamma ray parameters by performing a waveform indication inversion algorithm on the clustering result of the single-frequency seismic waveform data in the time window of the stratum, the standardized gamma ray parameters and clustering results of a corresponding well depth, well location information and single-frequency seismic waveform data in the time window of the stratum of the standardized gamma ray parameters;

step S700, using the frequency-divided inversion data bodies of the gamma ray parameters as pre-drilling prediction frequency division gamma ray distribution models;

step S800, obtaining a pre-drilling prediction full-band gamma ray distribution model by superimposing the pre-drilling prediction frequency division gamma ray distribution models corresponding to low-frequency, intermediate-frequency and high-frequency, determining a threshold value of the pre-drilling prediction full-band gamma ray distribution model according to a logging lithology interpretation, discriminating lithology based on the threshold value, and establishing a current pre-drilling lithology prediction model based on the discriminated lithology;

step S900, planning a current well trajectory based on the pre-drilling lithology prediction model;

step S1000, extracting a three-dimensional coordinate of the current well trajectory, and extracting a borehole-side pre-drilling full-band gamma ray prediction curve or a frequency division gamma ray prediction curve while drilling from the pre-drilling full-band gamma ray distribution model based on the three-dimensional coordinate, computing a correlation coefficient between the borehole-side pre-drilling full-band gamma ray prediction curve and a gamma ray curve measured by a real drilling instrument, or a correlation coefficient between the frequency division gamma ray prediction curve while drilling and the gamma ray curve measured by the real drilling instrument, and selecting a combination of the single-frequency seismic waveform data with the highest correlation coefficient as a currently selected combination of the single-frequency seismic waveform data;

step S1100, computing a frequency division gamma ray distribution model while drilling, updated by drilling, according to the frequency-divided inversion data bodies of the gamma ray parameters corresponding to the currently selected combination of the single-frequency seismic waveform data and the gamma ray curve measured by the real drilling instrument; and step S1200, replacing the pre-drilling prediction frequency division gamma ray distribution model with the frequency division gamma ray distribution model while drilling, updated by drilling, and repeating the methods in steps S800-S1100 until a drilling task is completed.

2. The method for updating the three-dimensional lithology model for precision navigation of the deep oil and gas in real time according to claim 1, wherein the pre-processing specifically comprises:

step A100, expressing a seismic record convolution model of the original seismic data in a frequency domain as:

$$s(\omega)=\sigma(\omega)\varepsilon(\omega),$$

wherein $s(\omega)$ represents a seismic record spectrum after Fourier transform, $\sigma(\omega)$ represents a seismic subwave spectrum after Fourier transform, $\varepsilon(\omega)$ represents a reflection coefficient spectrum after Fourier transform, and $\omega$ represents an angle frequency;

step A200, transforming a representation of the seismic record convolution model in the frequency domain into a representation of a frequency domain of a seismic record linear system:

$$ln s(\omega)=ln\sigma(\omega)+ln\varepsilon(\omega),$$

wherein $ln s(\omega)$ is the representation of the frequency domain of the seismic record linear system, $ln\sigma(\omega)$ is a representation of a frequency domain of a seismic subwave linear system, and $ln\varepsilon(\omega)$ is a representation of a frequency domain of a reflection coefficient linear system;

step A300, obtaining, by performing inverse Fourier transform on the representation of the frequency domain of the seismic record linear system, a cepstrum sequence of the seismic record spectrum:

$$\tilde{s}(t)=\tilde{\sigma}(t)+\tilde{\varepsilon}(t),$$

wherein $\tilde{s}(t)$ represents the cepstrum sequence of the seismic record spectrum, $\tilde{\sigma}(t)$ represents a cepstrum sequence of the seismic subwave spectrum, $\tilde{\varepsilon}(t)$ represents a cepstrum sequence of the reflection coefficient spectrum, and t represents a seismic arrival-time;

step A400, separating a subwave cepstrum sequence and a reflection coefficient cepstrum sequence in a cepstrum by means of a low-pass filter, and extracting a subwave amplitude;

step A500, simulating a seismic subwave amplitude by means of a least square method based on the subwave amplitude:

$$\sigma(f)=A(f)f^{\alpha}e^{H(f)},$$

wherein $\alpha$ represents a constant larger than or equal to 0, $\sigma(f)$ represents the seismic subwave spectrum obtained by Fourier transform of $\sigma(t)$, $H(f)$ and $A(f)$ are to-be-solved polynomials of a frequency f for fitting a seismic subwave amplitude spectrum, and e represents a natural constant;

step A600, obtaining a maximum phase component and a minimum phase component of a subwave based on the simulated seismic subwave amplitude spectrum, wherein let the maximum phase component and the minimum phase component of the subwave $\sigma(t_{theo})$ as $u(t_{theo})$ and $v(t_{theo})$, then the subwave $\sigma(t_{theo})$ is:

$$\sigma(t_{theo})=u(t_{theo})\cdot v(t_{theo}); \text{ and}$$

a representation in the cepstrum of the amplitude spectrum is:

$$2\widetilde{\sigma_0}(t_{theo})=\tilde{u}(t_{theo})+\tilde{v}(t_{theo})+\tilde{u}(-t_{theo})+\tilde{v}(-t_{theo}),$$

wherein the cepstrum $\widetilde{\sigma_{\tilde{s}}}(t_{theo})$ of the amplitude spectrum is symmetrically displayed on positive and negative axes of the cepstrum, $\hat{u}(t_{theo})$ is a cepstrum of a minimum phase function on a positive axis corresponding to a maximum phase component $u(t_{theo})$ of the seismic subwave, $\tilde{v}(t_{theo})$ is a cepstrum of a maximum phase function on the positive axis corresponding to a minimum phase component $v(t_{theo})$ of seismic subwave, $\tilde{v}(-t_{theo})$ is a cepstrum of a maximum phase function on a negative axis corresponding to the minimum phase component $v(t_{theo})$ of seismic subwave, and $\tilde{u}(-t_{theo})$ is a cepstrum of a minimum phase function on the negative axis corresponding to the maximum phase component $u(t_{theo})$ of the seismic subwave;

step A700, determining a set of a mixed phase subwave sets with a same amplitude spectrum based on the cepstrum of the amplitude spectrum, adjusting a Yu subwave parameter, and obtaining, by increasing an effective bandwidth to a preset bandwidth threshold, shaped waveform data on the premise of ensuring the integrity of a dominant frequency of the seismic subwave;

step A800, constructing a tensor diffusion model based on the shaped waveform data:

$$\begin{cases} \frac{\partial U}{\partial \tau} = div(D \cdot \nabla U) \\ U|_{\tau=0} = U_0 \end{cases},$$

wherein $\tau$ represents a diffusion time, div represents a divergence operator, D represents a diffusion tensor, U represents a diffusion filtering result, $U|_{\tau=0}$ represents a diffusion filtering result when $\tau=0$, $U_0$ represents the shaped waveform data at the time of $\tau=0$, serving as an initial condition of the tensor diffusion model, and $\nabla U$ represents a gradient of the diffusion filtering result; and constructing a gradient structure tensor based on the tensor diffusion model:

$$J_\rho(\nabla U) = G_\rho * J_0 = G_\rho * (\nabla U (\nabla U)^T),$$

wherein U represents the diffusion filtering result, $J_0$ represents a gradient vector tensor product, and $G_\rho$ represents a Gaussian function with a scale of $\rho$:

$$G_\rho(r) = (2\pi\rho^2)^{-3/2} \exp(-|r|^2/(2\rho^2)),$$

wherein r represents a computational radius;

a feature vector of the structure tensor is:

$$J_\rho(\nabla U) = (v_1 \ v_2 \ v_3) \begin{pmatrix} \xi_1 & 0 & 0 \\ 0 & \xi_2 & 0 \\ 0 & 0 & \xi_3 \end{pmatrix} (v_1 \ v_2 \ v_3)^T,$$

wherein $v_1$, $v_2$ and $v_3$ represent 3 feature vectors of the gradient structure tensor, considered as a local orthogonal coordinate system; $v_1$ directs to a gradient direction of the seismic signal; a plane consisting of $v_2$ and $v_3$ is parallel to a local structure feature of the seismic signal; and $\xi_1$, $\xi_2$ and $\xi_3$ are three feature values corresponding to $v_1$, $v_2$ and $v_3$;

step A900, computing a linear structure confidence measure, a planar structure confidence measure and a diffusion tensor separately based on the feature vector of the structure tensor, wherein the linear structure confidence measure $C_{line}$ is:

$$C_{line} = \frac{\xi_2 - \xi_3}{\xi_2 + \xi_3},$$

the planar structure confidence measure $C_{plane}$ is:

$$C_{plane} = \frac{\xi_1 - \xi_2}{\xi_1 + \xi_2},$$

the diffusion tensor D is:

$$D = (v_1 \ v_2 \ v_3) \begin{pmatrix} \mu_1 & 0 & 0 \\ 0 & \mu_2 & 0 \\ 0 & 0 & \mu_3 \end{pmatrix} (v_1 \ v_2 \ v_3)^T = \begin{pmatrix} D_{11} & D_{12} & D_{13} \\ D_{21} & D_{22} & D_{23} \\ D_{31} & D_{32} & D_{33} \end{pmatrix},$$

wherein $\mu_1$, $\mu_2$ and $\mu_3$ represent three non-negative feature values of the diffusion tensor, representing filtering strengthens of a diffusion filter in three feature directions $v_1$, $v_2$ and $v_3$ respectively; and step A1000, obtaining, by repeating steps A100-A900 until a preset number of iterations is reached, the diffusion filtering result, i.e., the pre-processed seismic data.

3. The method for updating the three-dimensional lithology model for precision navigation of the deep oil and gas in real time according to claim 1, wherein the method for obtaining the standardized logging data specifically comprises:

step B10, using the original logging data as a to-be-processed data set X;

step B20, forming, by randomly extracting φ data points from the to-be-processed data set X, a to-be-processed data subset X', and storing the to-be-processed data subset in a root node;

step B30, randomly selecting a dimension q from the to-be-processed data set X, and making the dimension q randomly generate a split point p, wherein the split point p satisfies $\min(x_{ij},j=q,x_{ij}\in X') < p < \max(x_{ij},j=q, x_{ij}\in X')$, $x_{ij}$ represents a data point in the data subset X', j represents a split point number, and i represents a data type;

step B40, generating a hyperplane that divides the data in the dimension q into two subspaces according to the generation of the split point p, and designating the data points, with a value smaller than p, in the dimension q to be placed in a first leaf node and the data points, with a value larger than or equal top, in the dimension q to be placed in a second leaf node;

step B50, performing recursion on methods described in steps B30-B40 until all leaf nodes have only one data point or an isolated tree that has reached a preset height;

step B60, repeating steps B30-B50 until T isolated trees are generated, wherein T represents a number of the isolated trees and the T isolated trees represent: the isolated trees have no external node of the leaf node, or have two leaf nodes $\{T_l, T_r\}$ and an internal node test, wherein $T_l$ represents a left leaf node of the isolated trees, $T_r$ represents a right leaf node of the isolated trees, l in the $T_l$ represents left and r in the $T_r$ represents right; the internal node test of the T isolated trees consists of the dimension q and the split point p; and the points satisfying q<p belong to $T_l$, and the others belong to $T_r$;

step B70, the T isolated trees being an isolated tree forest, letting each data point $x_i$ traverse each isolated tree, and computing a number of the data points $x_i$ at a height $h(x_i)$ of each isolated tree, i.e., edges of the data points $x_i$ passing from the root nodes of the located isolated trees to the leaf nodes; and then, computing an average height of the data points $x_i$ in the isolated tree forest, and obtaining, by normalizing an average height of all the data points, a normalized average height $\overline{h(x_l)}$ of the data points, wherein l in the $\overline{h(x_l)}$ represents a data type;

step B80, computing an outlier score $s(x,\varphi)$ based on the normalized average height $\overline{h(x_l)}$ of the datapoints:

$$s(x, \varphi) = 2^{\frac{E(\overline{h(x_l)})}{\overline{c(\varphi)}}},$$

wherein $\overline{c(\varphi)}$ represents an average value of a path length of a binary tree constructed by $\varphi$ data points, and $E(*)$ represents an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases}$$

wherein H(i) represents a harmonic number, estimated by means of ln(i)+0.5772156649, and 0.5772156649 is an Euler constant; and when the outlier score $s(x,\varphi)$ is smaller than a preset outlier threshold s, the corresponding data points are eliminated to obtain logging data $C=\{c_1, \ldots, c_\alpha, \ldots, c_m\}$, $1 \leq \alpha \leq m$, $c_\alpha \in C$ with outliers eliminated, C represents logging data with outliers eliminated, c represents data points in the logging data with outliers eliminated, a represents a serial number of the data points in the logging data with outliers eliminated and m represents a number of the data points in the logging data with outliers eliminated; and step B90, standardizing the continuous logging data with the outliers deleted to obtain the standardized logging data:

$$C_Z = \frac{(g_Z - \text{Average}(g))}{v},$$

wherein $g_z$ represents the $z^{th}$ sampling point data value of the logging data with the outliers deleted; Average represents a computing average value; g represents all data sample points of the logging data with the outliers deleted; v represents a variance of the logging data with the outliers deleted; and $c_z$ represents the $z^{th}$ sampling point data value of the standardized logging data with the outliers deleted.

4. The method for updating the three-dimensional lithology model for precision navigation of the deep oil and gas in real time according to claim 1, wherein step S400 specifically comprises:

step S410, determining three-dimensional surface curved data of the target horizon $t_1(x,y)$ as the time window top three-dimensional surface according to the historical geological data, wherein $t_1$ represents the target horizon, K represents a coordinate of the three-dimensional surface curved data on an X-axis, and y represents a coordinate of the three-dimensional surface curved data on a Y-axis;

step S420, determining a dominant frequency f (Hz) of the target horizon according to the pre-processed seismic data;

step S430, computing a complete seismic wave length based on the dominant frequency of the target horizon: $\Delta t=1/f(s)$ wherein $\Delta t$ represents the complete seismic wave length, f(s) represents a frequency of the complete seismic wave, and s represents the complete seismic wave; and step S440, obtaining the time window bottom three-dimensional curved surface by means of downward continuation of $\Delta t$ according to the time window top three-dimensional surface.

5. The method for updating the three-dimensional lithology model for precision navigation of the deep oil and gas in real time according to claim 1, wherein the extracting a borehole-side full-band gamma ray prediction curve specifically comprises:

letting n be a number of times of the current drilling trajectory;

when n>1, extracting a three-dimensional coordinate, designed by the $n^{th}$ drilling, of the $(n+1)^{th}$ drilling well trajectory, and extracting the $(n+1)^{th}$ frequency division gamma ray prediction curve while drilling from the $(n+1)^{th}$ pre-drilling prediction frequency division gamma ray distribution model updated by the $n^{th}$ drilling according to the three-dimensional coordinate of the $(n+1)^{th}$ drilling trajectory; and when n=1, extracting a three-dimensional coordinate of the first drilling trajectory, and extracting the full-band gamma ray prediction curve from the pre-drilling prediction full-band gamma ray distribution model according to the three-dimensional coordinate of the first drilling trajectory.

6. The method for updating the three-dimensional lithology model for precision navigation of the deep oil and gas in real time according to claim 5, wherein the computing a correlation coefficient between the borehole-side pre-drilling full-band gamma ray prediction curve and a gamma ray curve measured by a real drilling instrument, specifically comprises:

when n>1, computing the correlation coefficient between the $(n+1)^{th}$ frequency division gamma ray prediction curve while drilling updated by the $n^{th}$ drilling and the gamma ray curve measured by the real drilling instrument in $(n+1)^{th}$ drilling; and when n=1, computing the correlation coefficient between the full-band gamma ray prediction curve and the gamma ray curve measured by the real drilling instrument in first drilling.

7. The method for updating the three-dimensional lithology model for precision navigation of the deep oil and gas in real time according to claim 1, wherein step S1200 specifically comprises:

when n=1, obtaining, by the method in steps S400-S600, a frequency division gamma ray distribution model while drilling, updated by drilling in second drilling, and a full-band gamma ray distribution model updated by drilling in second drilling according to the gamma ray curve measured by the real drilling instrument in first drilling and the seismic data corresponding to the single frequency currently selected in first drilling; and when n>1, obtaining, by the method in steps S400-S600, a frequency division gamma ray distribution model while $(n+1)^{th}$ drilling, updated by $n^{th}$ drilling, and an $(n+1)^{th}$ full-band gamma ray distribution model updated while drilling in $n^{th}$ drilling according to the gamma ray curve measured by the real drilling instrument in $(n+1)^{th}$ drilling and the seismic data corresponding to the single frequency currently selected in $(n+1)^{th}$ drilling.

8. A system for updating a three-dimensional lithology model for precision navigation of deep oil and gas in real time, comprising:

a data acquisition and pre-processing module, configured to collect original seismic data and original logging data, and pre-process the original seismic data to obtain pre-processed seismic data, the original logging data comprising multi-well gamma ray logging data, a standardization module, configured to perform, based on the original logging data, outlier processing by means of an isolated forest algorithm to obtain logging data with outliers deleted, the logging data with the outliers deleted comprising gamma ray parameters with outliers deleted; and standardizing the logging data with the outliers deleted to obtain standardized logging data, the standardized logging data comprising standardized gamma ray parameters;

a data frequency division module, configured to perform, based on the pre-processed seismic data, frequency division processing by means of a processed wavelet basis function to obtain frequency-divided seismic data, the frequency-divided seismic data comprising three types of single-frequency seismic waveform data, i.e., low-frequency seismic data, intermediate-frequency seismic data, and high-frequency seismic data, wherein a method for obtaining the frequency-divided seismic data comprises:

designing, according to the pre-processed seismic data, a processed wavelet basis function better matching with the pre-processed seismic data based on a Mollet wavelet basis function:

$$\psi_g(t) = \frac{k}{\sqrt{2\pi}\sigma^3} e^{-\frac{t^2}{2\sigma^2}+\omega 2\pi\mu t}\left(1 - \frac{t^2}{\sigma^2} + 4\pi^2\mu^2\sigma^2 + \omega 4\pi\mu t\right);$$

and wherein $\psi_g$ represents the wavelet basis function, t represents a time, k represents a variable making the processed wavelet basis function satisfy a normalization condition, $\sigma$ represents an interval of a time-frequency two-dimensional resolution, $\mu$ represents a constant controlling a center position of a frequency after wavelet transformation, $\omega$ represents an imaginary unit, $\pi$ represents a circular constant, and e represents a natural constant;

letting the processed wavelet basis function satisfy the normalization condition $\|\psi_g\|^2=1$, and there is $$k = \sqrt{2\sigma}\pi^{\frac{1}{4}}\left(\mu^4 + \frac{48\mu^2\sigma^2\pi^2+3}{64\sigma^4\pi^4}\right)^{-\frac{1}{2}};$$

inputting all seismic channel data, and performing frequency division transformation on a seismic channel by means of the processed wavelet basis function to obtain the frequency-divided seismic data $W^g$:

$$W^g(a,b) = \frac{2a^2 k_2}{f_p^3 \sqrt{\alpha}} e^{-2\sigma^2\pi^2\mu^2+\frac{\beta}{4\alpha}}\left(\left(\frac{\beta}{2\alpha}\right)^4 + \frac{3}{\alpha}\left(\frac{\beta}{2\alpha}\right)^2 + 3\left(\frac{1}{2\alpha}\right)^2\right);$$

and a represents a scale factor, b represents a time-shift factor, $W^g(a,b)$ represents amplitude values of a specific frequency a and a specific time b, $f_p$ represents a frequency of a wavelet basis, $k_2$ represents a variable making the processed wavelet basis function satisfy a normalization condition, and $\alpha$ and $\beta$ are distributed parameters in normal distribution $$N\left(\frac{\beta}{2\alpha}, \frac{1}{2\alpha}\right)$$

respectively, wherein N represents a normal distribution;

a three-dimensional time window division module, configured to determine a time window top three-dimensional curved surface and a time window bottom three-dimensional surface of a stratum according to a three-dimensional surface of a target horizon and visual seismic data;

a waveform clustering module, configured to obtain a clustering result of single-frequency seismic waveform data in a time window of the stratum by means of a clustering algorithm according to the frequency-divided seismic data and the time window top three-dimensional curved surface and the time window bottom three-dimensional surface of the stratum;

a frequency-divided inversion module, configured to obtain frequency-divided inversion data bodies of the gamma ray parameters by performing a waveform indication inversion algorithm on the clustering result of the single-frequency seismic waveform data in the time window of the stratum, the standardized gamma ray parameters and clustering results of a corresponding well depth, well location information and single-frequency seismic waveform data in the time window of the stratum of the standardized gamma ray parameters;

a pre-drilling frequency division gamma ray prediction model acquisition module, configured to use the frequency-divided inversion data bodies of the gamma ray parameters as pre-drilling prediction frequency division gamma ray distribution models;

a lithology prediction model acquisition module, configured to obtain a pre-drilling prediction full-band gamma ray distribution model by superimposing the pre-drilling prediction frequency division gamma ray distribution models corresponding to low-frequency, intermediate-frequency and high-frequency, determine a threshold value of the pre-drilling prediction full-band gamma ray distribution model according to a logging lithology interpretation, discriminate lithology based on the threshold value, and establish a current pre-drilling lithology prediction model based on the discriminated lithology;

a well trajectory planning module, configured to plan a current well trajectory based on the pre-drilling lithology prediction model;

a current single frequency selection module, configured to extract a three-dimensional coordinate of the current well trajectory and extract a borehole-side pre-drilling full-band gamma ray prediction curve or a frequency division gamma ray prediction curve while drilling from the pre-drilling full-band gamma ray distribution model based on the three-dimensional coordinate, compute a correlation coefficient between the borehole-side pre-drilling full-band gamma ray prediction curve and a gamma ray curve measured by a real drilling instrument, or a correlation coefficient between the frequency division gamma ray prediction curve while drilling and the gamma ray curve measured by the real drilling instrument, and select a combination of the single-frequency seismic waveform data with the highest correlation coefficient as a currently selected combination of the single-frequency seismic waveform data;

a model updating module, configured to compute a frequency division gamma ray distribution model while drilling, updated by drilling, according to the frequency-divided inversion data bodies of the gamma ray parameters corresponding to the currently selected combination of the single-frequency seismic waveform data and the gamma ray curve measured by the real drilling instrument; and a circulation drilling module, configured to replace the pre-drilling prediction frequency division gamma ray distribution model with the frequency division gamma ray distribution model while drilling, updated by drilling, and repeat the methods in the lithology prediction model acquisition module, the well trajectory planning module, the current single frequency selection module and the model updating module until a drilling task is completed.

* * * * *